United States Patent
Xu et al.

(10) Patent No.: US 9,342,923 B2
(45) Date of Patent: *May 17, 2016

(54) SYSTEMS AND METHODS FOR CREATING A THREE-DIMENSIONAL TEXTURE ATLAS

(71) Applicant: Landmark Graphics Corporation, Houston, TX (US)

(72) Inventors: Zitao Xu, Katy, TX (US); Venkatraman Viswanathan, Spring, TX (US); Scott Senften, Sugar Land, TX (US); Charles Sembroski, Katy, TX (US); Ya Sun, Katy, TX (US); Mary Cole, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,294

(22) Filed: Dec. 29, 2014

(65) Prior Publication Data

US 2015/0109295 A1   Apr. 23, 2015

Related U.S. Application Data

(63) Continuation of application No. 14/411,619, filed as application No. PCT/US2012/044366 on Jun. 27, 2012.

(51) Int. Cl.
*G06T 15/04* (2011.01)
*G06T 15/08* (2011.01)
*G06T 17/20* (2006.01)

(52) U.S. Cl.
CPC ............. *G06T 15/08* (2013.01); *G06T 15/04* (2013.01); *G06T 17/205* (2013.01)

(58) Field of Classification Search
None
See application file for complete search history.

(56) References Cited

U.S. PATENT DOCUMENTS

| | | | | |
|---|---|---|---|---|
| 2006/0284880 A1* | 12/2006 | Zhou et al. | | 345/582 |
| 2007/0091108 A1* | 4/2007 | Spicer | | 345/582 |
| 2008/0303840 A1* | 12/2008 | Zhou et al. | | 345/585 |
| 2012/0330628 A1* | 12/2012 | McDaniel et al. | | 703/2 |
| 2013/0016109 A1* | 1/2013 | Garanzha | | 345/501 |

* cited by examiner

*Primary Examiner* — Phi Hoang
*Assistant Examiner* — Diane Wills
(74) *Attorney, Agent, or Firm* — Crain, Caton & James; John Wustenberg

(57) ABSTRACT

Systems and methods for reducing the amount of texture cache memory needed to store a texture atlas by using uniquely grouped refined triangles to create each texture atlas.

16 Claims, 3 Drawing Sheets

SYSTEMS AND METHODS FOR CREATING A THREE-DIMENSIONAL TEXTURE ATLAS

CROSS-REFERENCE TO RELATED APPLICATIONS

This application is a continuation of U.S. patent application Ser. No. 14/411,619 which is incorporated herein by reference, and claims the priority of PCT Patent Application Serial No. PCT/US2012/044366, filed on Jun. 27, 2012, which is incorporated herein by reference.

STATEMENT REGARDING FEDERALLY SPONSORED RESEARCH

Not applicable.

FIELD OF THE INVENTION

The present invention generally relates to systems and methods for creating a three-dimensional (3D) texture atlas. More particularly, the present invention relates to reducing the amount of texture cache memory needed to store a texture atlas by using uniquely grouped refined triangles to create each texture atlas.

BACKGROUND OF THE INVENTION

In some fields, it is useful to model real or computer-generated objects in three dimensions. Modeling such objects proves useful in a variety of applications. For example, modeling the subsurface structure of a portion of the earth's crust is useful for finding oil deposits, locating fault lines, and in other geological applications. Similarly, modeling human body parts is useful for medical training exercises, diagnoses, performing remote surgery, or for other medical applications. Modeling computer-generated objects is useful in creating computer games, designing flight simulations, and other applications. Other applications for 3D modeling of real and computer-generated objects exist.

Some 3D models represent an object as a 3D matrix of volume data points. Such a matrix, known as a data volume, includes a plurality of data points, known as volume data points. Each volume data point may be referred to as a volume pixel, also known as a voxel. A voxel is the smallest distinguishable box-shaped part of a 3D image. A voxel is similar to a pixel, but represents a 3D volume rather than a two-dimensional (2D) area. Each voxel represents a discrete sampling of a 3D portion of the object being modeled.

Once a data volume has been created, its contents can be displayed to users. A user may specify a 3D surface contained within the volume, and a display system displays the voxels on this surface on a screen or other display medium. This enables a user to view voxels that are contained in the interior of the data volume.

One system for displaying the voxels on an arbitrary 3D surface is known as 3D texture mapping. This technique is implemented in the raster processing unit of a computer graphics hardware accelerator. This technique uses a specific specialized memory, known as texture cache or texture memory, that is set aside on the integrated circuit.

Such a technique has certain inherent properties that render it inefficient for particular situations. For example, for data volumes that are large compared to the size of the available texture cache, the data volume must be broken up into blocks and each block must be swapped into the texture cache. This is inefficient because of the relatively large overhead required in determining the size of each block and reading it into the texture cache.

Furthermore, even though only the voxels that lie on the 3D surface may be needed by the raster processing unit in such a technique, every voxel in the data volume is read into and stored in the texture cache. Thus, memory in the texture cache is not used efficiently because a relatively large amount of unneeded data may be stored in the texture cache. This problem is exacerbated when the 3D surface is small compared to the data volume.

In addition, because a relatively large amount of texture cache is used in this operation, the amount of texture cache available to other graphics operations is limited. This limits the performance of the rendering of the object and limits the performance of other graphics operations.

Other techniques well-known in the art include subdividing a polygonal surface into multiple polygons and creating a texture tile for each polygon wherein each texture tile is used to form one or more texture atlases. A texture tile is a set of refined triangles and its bounding volume, which contains 3D texture data. A texture atlas is a group of texture tiles, which are usually arranged for the texture atlas to contain the maximum number of texture tiles. Such techniques, however, may still leave empty or unused space in each texture atlas that requires memory in the texture cache to store.

SUMMARY OF THE INVENTION

The present invention therefore, meets the above needs and overcomes one or more deficiencies in the prior art by reducing the amount of texture cache memory needed to store a texture atlas using uniquely grouped refined triangles to create each texture atlas.

SUMMARY OF THE INVENTION

In one embodiment, the present invention includes a method for creating a three-dimensional texture atlas, which comprises: i) subdividing a three-dimensional triangle mesh into a plurality of refined triangles; ii) grouping the plurality of refined triangles into one or more groups of refined triangles using a computer processor; iii) scanning each group of refined triangles within a three-dimensional bounding volume to form a standardized texture tile or a non-standardized texture tile; iv) reducing an amount of computer texture cache memory required to store a texture atlas by combining each standardized texture tile to form at least one three-dimensional texture atlas, wherein the at least one three-dimensional texture atlas comprises an equal number of standardized texture tiles in each dimension of the at least one three-dimensional texture atlas; and v) storing each texture atlas in the computer texture cache memory.

In another embodiment, the present invention includes a non-transitory program carrier device tangibly carrying computer executable instructions for creating a three-dimensional texture atlas, the instructions being executable to implement: i) subdividing a three-dimensional triangle mesh into a plurality of refined triangles; ii) grouping the plurality of refined triangles into one or more groups of refined triangles; iii) scanning each group of refined triangles within a three-dimensional bounding volume to form a standardized texture tile or a non-standardized texture tile; iv) reducing an amount of computer texture cache memory required to store a texture atlas by combining each standardized texture tile to form at least one three-dimensional texture atlas, wherein the at least one three-dimensional texture atlas comprises an equal number of standardized texture tiles in each dimension of the at least one three-dimensional texture atlas; and v) storing each texture atlas in the computer texture cache memory.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

The present invention utilizes an octree, which is a well-known tree data structure in which each internal node has exactly eight children, to partition a 3D space by recursively subdividing it into eight octants also referred to herein as leafs. All octree leafs in an octree are the same size and each octree leaf corresponds to a specific geometric location in the texture cache memory. An octree is a 3D analog of a 2D quadtree, which is used herein to illustrate the present invention. The present invention however, utilizes an octree for spatial indexing of refined triangles to reduce the amount of memory in the texture cache needed for each texture atlas.

Method Description

Figure 1:
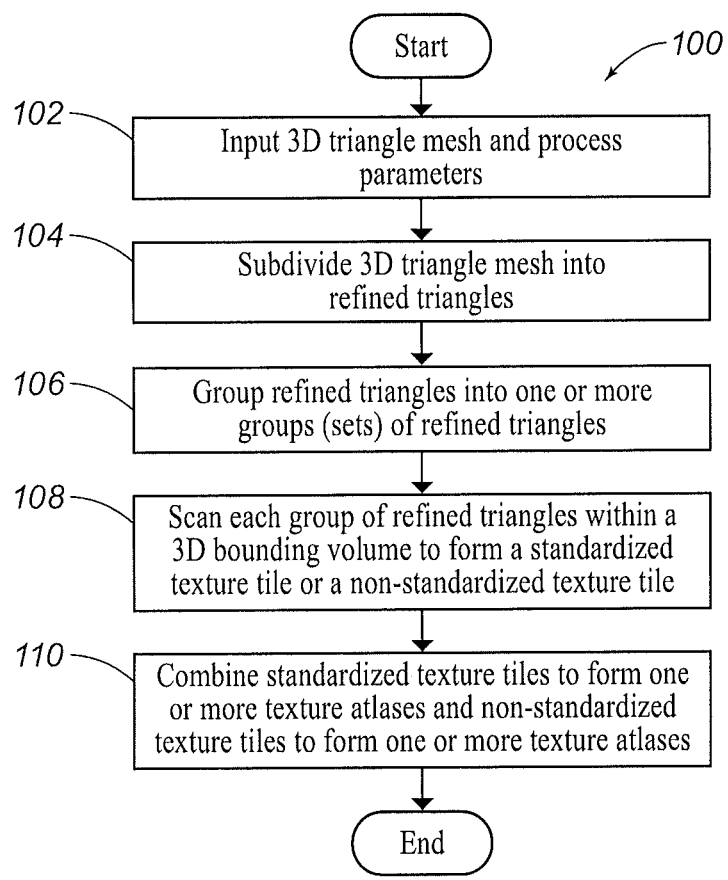
FIG. 1 is a flow diagram illustrating one embodiment of a method for implementing the present invention.

Referring now to FIG. 1, a flow diagram of one embodiment of a method 100 for implementing the present invention is illustrated. The method 100 reduces the amount of texture cache memory that is needed to store each texture atlas.

Figure 5:
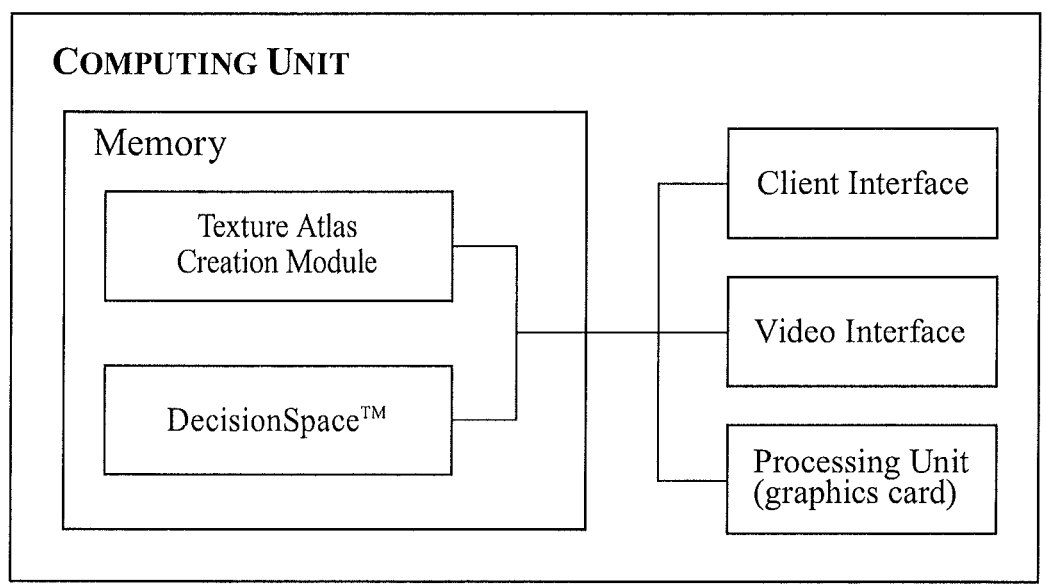
FIG. 5 is a block diagram illustrating one embodiment of a computer system for implementing the present invention.

In step 102, a 3D triangle mesh and process parameters are input using the client interface and/or the video interface described in reference to FIG. 5. The 3D triangle mesh may be an original mesh or it may be generated by a conversion from a non-triangle mesh using techniques well-known in the art. Only one octree is required to process all 3D triangle meshes together, but often there is only one 3D triangle mesh. The process parameters may include, but are not limited to: i) the maximum refined triangle size, which is a predetermined longest edge length for each refined triangle; ii) the octree leaf size, wherein each dimension of its volume is at least three times larger than the longest edge length that defines the maximum refined triangle size; iii) the number of octree leafs for each octree, which is $2^{(3n)}$ and n is often at least 4; iv) a preferred 3D bounding volume size, wherein each dimension of the preferred 3D bounding volume is less than or equal to $2^k$ and k equals any positive integer that limits the size of the preferred 3D bounding volume to the octree leaf size plus the maximum refined triangle size; and v) the number of texture tiles for each dimension of the 3D texture atlas, which is based on the number of total texture tiles and the capacity of the graphics processor. A graphics processor with a large capacity will thus, permit fewer (larger) texture atlases to be formed while smaller capacity graphics processors may require more (smaller) texture atlases to be formed. In other words, fewer texture atlases will produce fewer texture objects and promote more texture cache memory and better performance. Because k is selected to place the preferred 3D bounding volume size as close in size to the octree leaf size plus the maximum refined triangle size, $2^k$ minus a dimension of the preferred 3D bounding volume size represents wasted texture cache memory in one dimension. The preferred 3D bounding volume size thus, promotes a balanced approach to achieve the most efficient size for each texture tile and each texture atlas.

Figure 2:
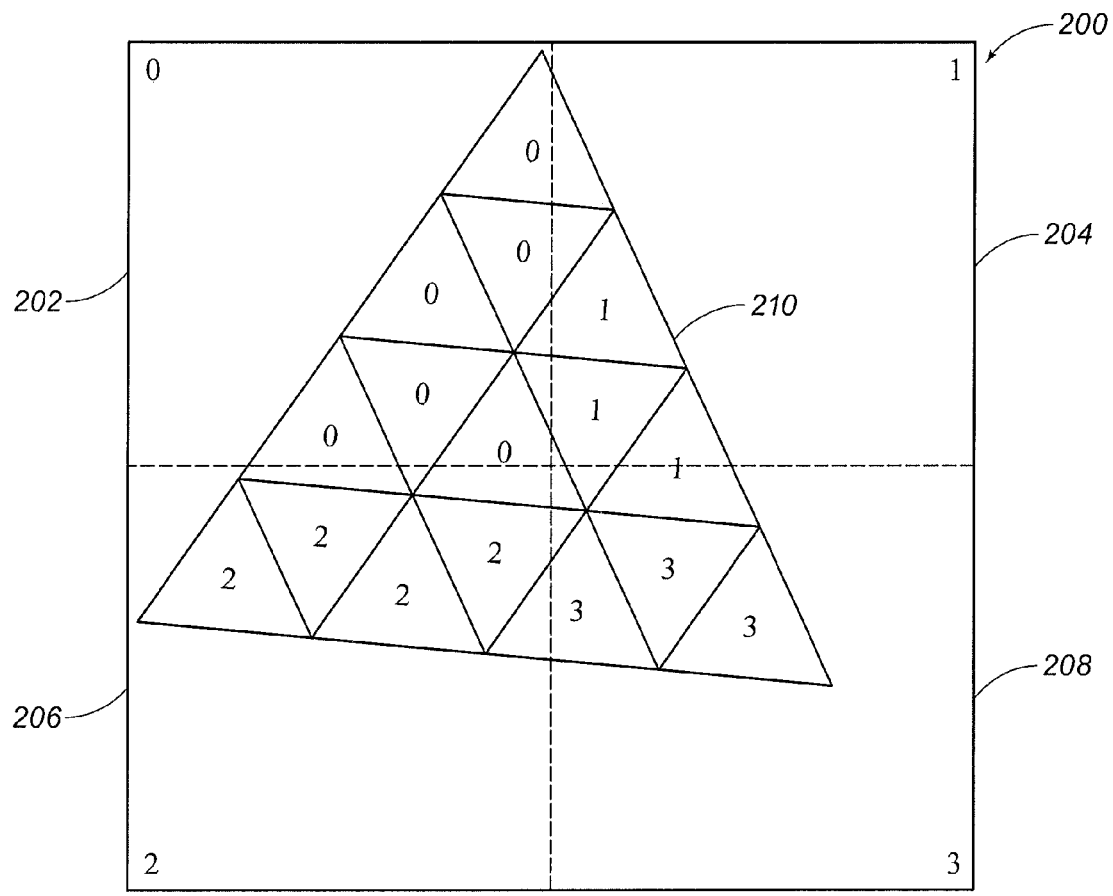
FIG. 2 is a graphical representation illustrating step 104 and step 106 in FIG. 1.

In step 104, the 3D triangle mesh is subdivided into refined triangles using techniques well-known in the art and the maximum refined triangle size. In FIG. 2, for example, the graphical representation of a 2D quadtree 200 is used to illustrate a 3D triangle mesh 210 subdivided into refined triangles that are each numbered. The 2D quadtree 200 includes four octree leafs (octants) 202, 204, 206 and 208. Given the maximum refined triangle size from step 102, the 3D triangle mesh is subdivided by repeatedly dividing the longest edge length of each triangle until each triangle is less than or equal to the maximum refined triangle size. In this manner, the shape and size of each refined triangle remains substantially the same.

In step 106, the refined triangles are grouped into one or more groups (sets) of refined triangles according to their spatial relationship (geometric location) to an octree leaf. In FIG. 2, for example, the refined triangles are numbered according to their spatial relationship to an octree leaf. Each refined triangle substantially i) within octree leaf 202 is assigned a 0; ii) within octree leaf 204 is assigned a 1; iii) within octree leaf 206 is assigned a 2; and iv) within octree leaf 208 is assigned a 3. Each refined triangle can only belong to one octree leaf and if it overlaps between two or more octree leafs, then it is assigned to the octree leaf containing the largest portion of the refined triangle.

Figure 3:
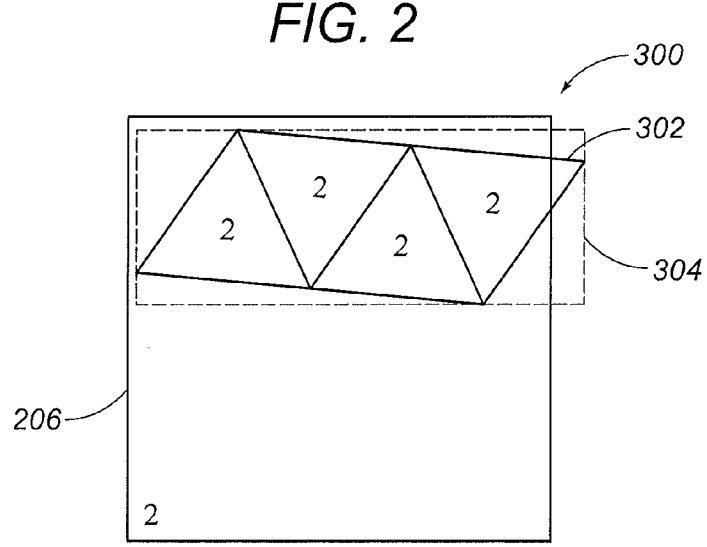
FIG. 3 is a graphical representation illustrating step 108 in FIG. 1.
Figure 4:
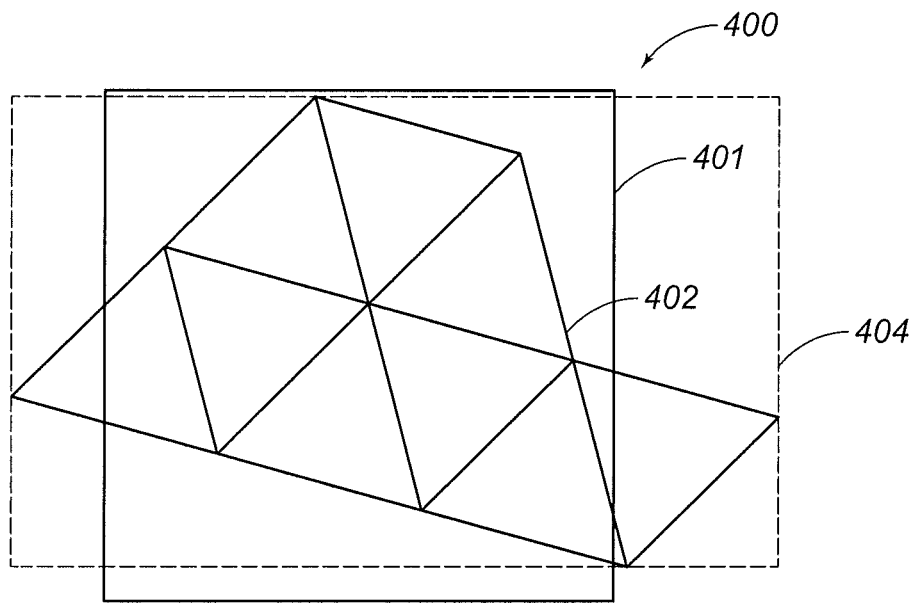
FIG. 4 is another graphical representation illustrating step 108 in FIG. 1.

In step 108, each group of refined triangles within a 3D bounding volume is scanned using techniques well-known in the art to form a standardized texture tile or non-standardized texture tile comprising a texture image and the corresponding group of refined triangles. If the size of the 3D bounding volume for a respective group of refined triangles meets the preferred 3D bounding volume size, then a standardized texture tile is formed by scanning. In FIG. 3, for example, the graphical representation 300 of octree leaf 206 illustrates a group of refined triangles 302 within a 3D bounding volume 304 that meets the preferred 3D bounding volume size. If the size of the 3D bounding volume for a respective group of refined triangles does not meet the preferred 3D bounding volume size, then a non-standardized texture tile is formed by scanning. In FIG. 4, for example, the graphical representation 400 of an octree leaf 401 illustrates a group of refined triangles 402 within a 3D bounding volume 404 that does not meet the preferred 3D bounding volume size. Each standardized texture tile is substantially the same size and shape. Each non-standardize texture tile is larger than a standardized texture tile. This delineation between standardized texture tiles and non-standardized texture tiles efficiently optimizes the use of texture cache memory in forming each texture atlas. In other words, the method 100 balances the size of each group of refined triangles and the size of the corresponding octree leaf to make the size of the 3D bounding volume for a respective group of refined triangles approach, without exceeding, the preferred 3D bounding volume size.

In step 110, the standardized texture tiles are combined to form one or more texture atlases and the non-standardized texture tiles are separately combined to form one or more texture atlases. In this manner, each texture atlas comprising the standardized texture tiles should include the same number of texture tiles in each dimension of the texture atlas. This promotes efficient use of the texture cache memory by reducing the amount of texture cache memory needed to store each texture atlas. The remaining non-standardized texture tiles that are combined to form one or more texture atlases will require more texture cache memory to store than the texture atlases comprising standardized texture tiles.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 5, a block diagram of a system for implementing the present invention on a computer is illustrated. The system includes a computing unit, sometimes referred to as a computing system, which contains memory, application programs, a client interface, a video interface and a processing unit that includes a graphics processor or graphics card. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-4. The memory therefore, includes a texture atlas creation module which enables the methods illustrated and described in reference to FIGS. 1-4 and integrates functionality from the remaining application programs illustrated in FIG. 5. The memory also includes DecisionSpace®, which may be used as an interface application to supply input data to the texture atlas creation model and/or display the data results from the texture creation module. Although DecisionSpace® may be used as an interface application, other interface applications may be used, instead, or the texture atlas creation module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for creating a three-dimensional texture atlas, which comprises:
   subdividing a three-dimensional triangle mesh into a plurality of refined triangles;
   grouping the plurality of refined triangles into one or more groups of refined triangles using a computer processor;
   scanning each group of refined triangles within a three-dimensional bounding volume to form a standardized texture tile or a non-standardized texture tile;
   reducing an amount of computer texture cache memory required to store a texture atlas by combining each standardized texture tile to form at least one three-dimensional texture atlas, wherein the at least one three-dimensional texture atlas comprises an equal number of standardized texture tiles in each dimension of the at least one three-dimensional texture atlas; and
   storing each texture atlas in the computer texture cache memory.

2. The method of claim 1, wherein the three-dimensional triangle mesh is subdivided into the plurality of refined triangles by repeatedly dividing a longest edge length of each triangle in the three-dimensional triangle mesh until each triangle is less than or equal to a maximum refined triangle size.

3. The method of claim 2, wherein the maximum refined triangle size is a predetermined longest edge length for each refined triangle.

4. The method of claim 1, wherein each refined triangle is substantially the same size and shape.

5. The method of claim 1, wherein each group of refined triangles within a three-dimensional bounding volume is scanned to form the standardized texture tile when a size of the three-dimensional bounding volume meets a preferred three-dimensional bounding volume size.

6. The method of claim 5, wherein each dimension of the preferred three-dimensional bounding volume is less than or equal to $2^k$ and k equals any positive integer that limits the size of the preferred three-dimensional bounding volume to an octree leaf size plus a maximum refined triangle size.

7. The method of claim 6, wherein each dimension of the octree leaf size defines a volume and each dimension of its volume is at least three times larger than a longest edge length that defines the maximum refined triangle size.

8. The method of claim 5, wherein each standardized texture tile is substantially the same size and shape.

9. A non-transitory program carrier device tangibly carrying computer executable instructions for creating a three-dimensional texture atlas, the instructions being executable to implement:
   subdividing a three-dimensional triangle mesh into a plurality of refined triangles;
   grouping the plurality of refined triangles into one or more groups of refined triangles;
   scanning each group of refined triangles within a three-dimensional bounding volume to form a standardized texture tile or a non-standardized texture tile;
   reducing an amount of computer texture cache memory required to store a texture atlas by combining each standardized texture tile to form at least one three-dimensional texture atlas, wherein the at least one three-dimensional texture atlas comprises an equal number of standardized texture tiles in each dimension of the at least one three-dimensional texture atlas; and
   storing each texture atlas in the computer texture cache memory.

10. The program carrier device of claim 9, wherein the three-dimensional triangle mesh is subdivided into the plurality of refined triangles by repeatedly dividing a longest edge length of each triangle in the three-dimensional triangle mesh until each triangle is less than or equal to a maximum refined triangle size.

11. The program carrier device of claim 10, wherein the maximum refined triangle size is a predetermined longest edge length for each refined triangle.

12. The program carrier device of claim 9, wherein each refined triangle is substantially the same size and shape.

13. The program carrier device of claim 9, wherein each group of refined triangles within a three-dimension bounding volume is scanned to form the standardized texture tile when a size of the three-dimensional bounding volume meets a preferred three-dimensional bounding volume size.

14. The program carrier device of claim 13, wherein each dimensional of the preferred three-dimensional bounding volume is less than or equal to $2^k$ and k equals any positive integer that limits the size of the preferred three-dimensional bounding volume to an octree leaf size plus a maximum refined triangle size.

15. The program carrier device of claim 14, wherein each dimension of the octree leaf size defines a volume and each dimension of its volume is at least three times larger than a longest edge length that defines the maximum refined triangle size.

16. The program carrier device of claim 13, wherein each standardized texture tile is substantially the same size and shape.

* * * * *